Figure 1:
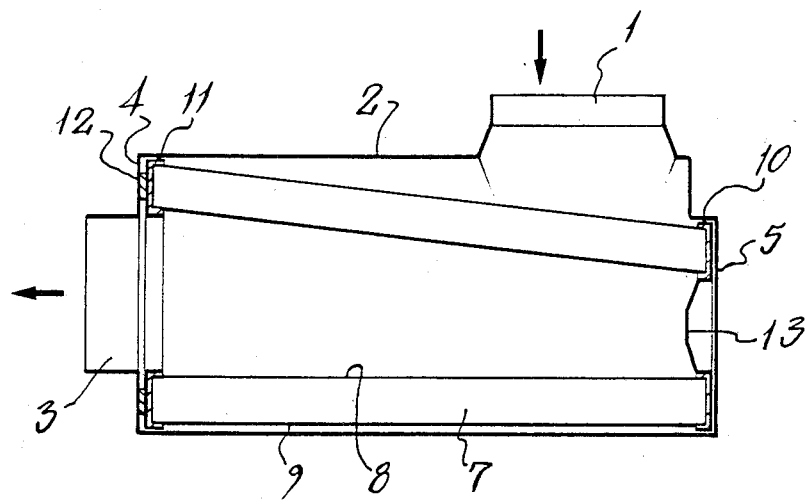

United States Patent [19]

Witchell

[11] Patent Number: 4,595,401
[45] Date of Patent: Jun. 17, 1986

[54] AIR FILTERS

[76] Inventor: Stanley P. Witchell, 17 Town Close, Vicarage Hill, Dartmouth, South Devon, England

[21] Appl. No.: 291,859

[22] Filed: Aug. 10, 1981

Related U.S. Application Data

[63] Continuation of Ser. No. 129,529, Mar. 12, 1980, abandoned, which is a continuation-in-part of Ser. No. 558,496, Mar. 14, 1975, abandoned.

[51] Int. Cl.$^4$ .................... B01D 50/00; B60J 13/02
[52] U.S. Cl. .................... 55/385 B; 55/502; 55/503; 55/505; 55/521; 55/528
[58] Field of Search ............. 55/337, 320, 327, 331, 55/332, 336, 413, 414, 418, 385 B, 447-450, 463, 473, 502, 503, 505, 521, DIG. 28

[56] References Cited

FOREIGN PATENT DOCUMENTS 761710 11/1956 United Kingdom .................. 55/337

OTHER PUBLICATIONS

Donaldson Bulletin 1200-272; 1976.

Primary Examiner—Frank Sever
Attorney, Agent, or Firm—William A. Drucker

[57] ABSTRACT

In an air cleaner employing a pleated paper filter element in the form of a frustrum of a cone mounted in a tubular air cleaner casing having a first opening axially thereof communicating with the inside of said element at the relatively wide end of said frustrum and a second opening in the cylindrical wall of said casing communicating with the outside of said frustrum in the vicinity of the relatively narrow end thereof, the axis of said element is tilted relative to the axis of the cleaner casing away from said second opening, whereby the radial clearance between the filter element and said opening is increased for a given filter element without increasing the size of the casing.

7 Claims, 3 Drawing Figures

AIR FILTERS

This application is a continuation of Ser. No. 129,527, filed Mar. 12, 1980, now abandoned which is a continuation-in-part of my copending application Ser. No. 558,496 filed on Mar. 14, 1975, now abandoned.

This invention relates to air cleaners of the kind comprising a casing having an inlet and an outlet and a pleated paper filter element mounted inside the casing so that in use, air flows from the inlet to the outlet through the element. More specifically, it is concerned with air filters in which the filter element is generally tubular in the form of a frustrum of a cone whose open ends are arranged to abut against opposite ends of the casing in sealing relation therewith so that air flowing from inlet to outlet is constrained to pass through the tubular wall of the element.

The filter element itself is usually replaceable, the casing being divisible to permit this replacement which is effected either at regular intervals, or simply whenever the element becomes choked by whatever contaminant is being filtered out of the air. In order to maximise the time between such successive replacements it is very desirable that the wall of the element should present the greatest possible utilisable surface area for receiving the contaminant without unduly obstructing either the inlet or outlet and that the flow of contaminated air should be evenly distributed over this surface area. The first of these requirements may be met in part by making the outside of the element the inlet side for the contaminated air, but for a given casing size, the second requirement restricts the maximum possible diameter of the element. Unfortunately, the size of the casing is also very often restricted by the space available to house it, a factor which is often outside the control of the cleaner manufacturer, particular in the automotive industry.

Increasing the filter element thickness radially inwardly can yield a valuable increase in the surface area, but in the context of a restricted size of casing it may also result in the outlet being at least in part obstructed, as well as in an excessive pressure drop appearing across the element.

In the case of pleated paper, further complications arise. The peaks and troughs of the pleats usually extend axially of the element and the depth of the pleats determines the radial thickness of the element. Clearly, the spacing of the pleats and their depth greatly affects the total utilisable surface area of paper in the cleaner, but a much more important practical consideration is the ease with which contaminating particles can penetrate into the pleats. Too close a spacing and/or too deep a pleat results in a large surface area but one which is poorly utilized because the walls defining the pleats, especially their radially innermost regions, are too close together.

As one reduces air cleaner casing diameter (for a given throughput), problems of increased pressure drop and excessive air velocities around the element, coupled with asymmetric dust distribution over the element surface manifest themselves. The increased pressure drop is the most serious problem, particularly where the first opening in the casing is tangentially directed.

According to the present invention, in an air cleaner of the kind set forth above employing a pleated paper filter element in the form of a frustrum of a cone mounted in a tubular air cleaner casing having a first opening axially thereof communicating with the inside of said element at the relatively wide end of said frustrum and a second opening in the cylindrical wall of said casing communicating with the outside of said frustrum in the vicinity of the relatively narrow end thereof, the axis of said element is tilted relative to the axis of the cleaner casing away from said second opening, whereby the radial clearance between the filter element and said opening is increased for a given filter element without increasing the size of the casing.

Preferably, the second opening is used as the inlet to the air cleaner, the outlet being the axial opening communicating with the inside of the element. This arrangement results in better utilisation of the total area of pleated paper making up the element, since the outer surface of the latter is more accessible to dust, particularly as regards the bottoms of the pleats.

It has been found that the modification of the invention primarily results in a significantly reduced pressure drop across the filter element; it also gives better (more uniform) distribution of dust over the total area of the paper, together with reduced air velocities around the element, but these latter two effects are of somewhat lesser significance. For a given element and casing size (length and diameter) and at a standard volume throughput, the result is an increase in the useful service life of the element. This is significant where physical constraints prevent the use of a larger diameter of casing. Of course, where appropriate, a rather larger throughput may be achieved for the same element service life.

Referring to the present invention, the desired tilt of the filter element axis can be achieved in at least two ways. Firstly, the opposite ends of the filter element may be arranged to lie in parallel planes which are at an angle to the normal to the axis of the element. Secondly, the end wall portions of the casing itself may be configured to receive and locate a normal, symmetrical element in a tilted axis attitude. This is to be preferred, since it considerably simplifies element production.

The filter element may also be in the form of two pleated paper frustoconical element portions assembled in partly telescoped relation with their overlapped ends joined by an impermeable member to prevent leakage through the annular space between them. Such an embodiment will be described later, with reference to FIG. 3. The preferred arrangement shown calls for the two frustoconical element portions to have a common axis which is tilted relative to the axis of the casing, as described above.

Figure 2:
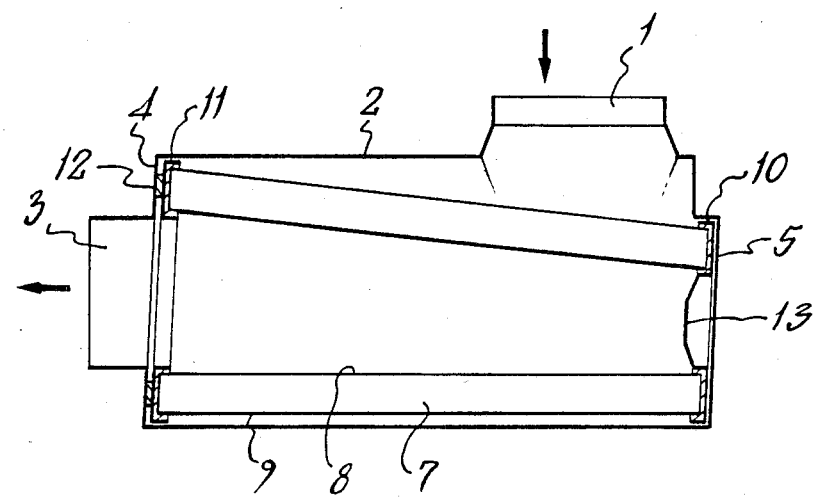
Figure 3:
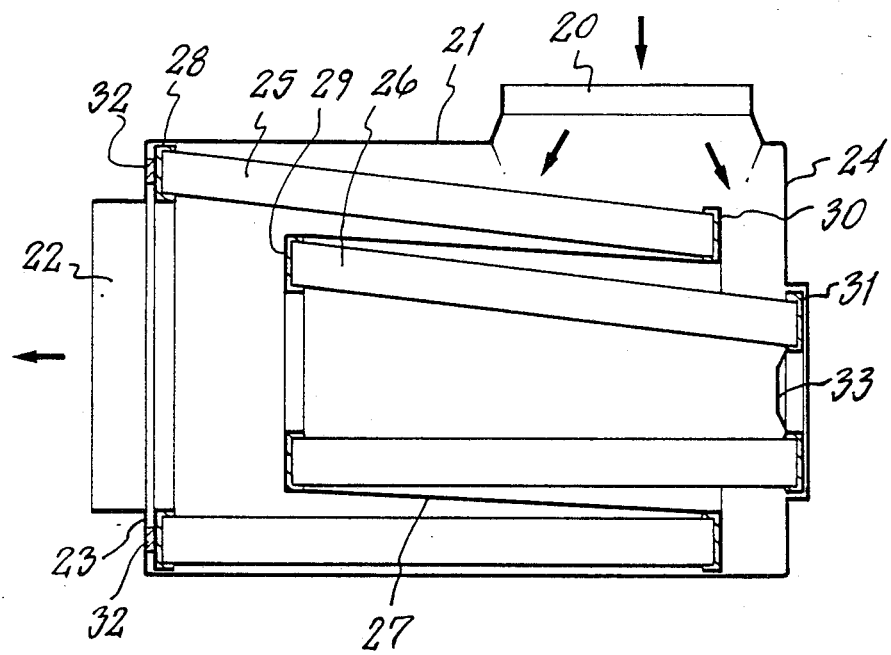

The invention will now be described by way of example with reference to the accompanying drawing in which:

FIG. 1 is a schematic cross-sectional side view of one form of air cleaner according to the invention, FIG. 2 is a schematic cross-sectional side view of another, preferred embodiment of the invention, and FIG. 3 shows another embodiment of the invention.

The arrangement of FIGS. 1 and 2 will be described first and since like parts in both figures correspond, like reference numerals will be used as far as practicable. Referring to the figures, an air filter comprises a cylindrical casing having a radial opening 1 in the cylindrical wall 2 and an axial opening 3 in one end wall, 4. The other end is closed by a removable cover 5 which serves to give access to a filter element installed inside the casing. Details of the method of attaching the cover 5 are not material to the present invention and need not be discussed in any detail. The filter element is constituted by a pleated paper filter medium 7 supported by inner and outer tubes 8, 9 respectively, of perforated metal. The ends of the pleats and the tubes are sealed into end caps 10, 11. The cap 11 is provided with the usual annular external gasket 12 which prevents communication between the inside and outside of the element (other than through the filter medium). The cap 10 includes a central blanking plate 13, which serves the same purpose as the gasket 12.

Referring to FIG. 1, the filter element 7 is generally frusto-conical, but the ends lie in parallel planes which are at a small angle to the normal to the axis of the cone. The element is installed in the casing so that one side of it lies substantially parallel to the wall of the casing opposite the radial opening 1. This causes the axis of the element to be tilted slightly with respect to the axis of the casing and the radial clearance between the opening 1 and the filter element outer perforated metal support tube 9 is thereby increased.

Referring now to FIG. 2, this shows a frusto-conical filter element installed in a casing in which the end wall 4 and the cover 5 are themselves arranged in parallel planes which are tilted with respect to the normal to the casing axis. This effect is exactly the same as in FIG. 1, but the filter element itself is symmetrical, i.e. conventional, with its ends lying in planes substantially normal to the axis of the cone. This arrangement has the advantage that only the casing has to be altered, whereas the FIG. 1 cleaner requires a special element, which must be correctly installed. The FIG. 2 element will be installed automatically in the correct attitude, without the possibility of operator error, although it will be necessary to use care in re-fitting the cover 5. The latter may be keyed to the casing so as to ensure correct fitting. Having regard to the relative ease of the manufacture of the element shown in FIG. 2, this configuration is preferred over FIG. 1. As previously mentioned, the first opening in the casing is preferably the inlet to the cleaner and the axial opening is preferably the outlet, since this configuration results in the best possible utilisation of the area of paper in the element.

An air cleaner of the FIG. 2 kind was constructed and compared with a similar, conventional air cleaner in which the axis of the element was not tilted relative to the axis of the casing. The cleaners were otherwise identical, with the following approximate dimensions.

Casing length 47 cm No. of pleats 160, Pleat depth 3.8 cm

Casing diameter 22 cm Normal rating

Element length 46 cm 17cubic/meters/minute

Each element had an outside diameter, at its relatively wide end, of 21 cm. Its relatively narrow end had an outside diameter of 18 cm. Both the inlet and outlet to the casing were slightly less than 13 cm in diameter.

On test at the rated throughput, the pressure drop across the conventional cleaner was nearly 12 cm of water, but across the cleaner of the invention it was only about 8 cm of water. This was a very significant reduction for a relatively small change in cleaner geometry.

It will be appreciated that the first opening in the casing should have a diameter substantially equal to the inside diameter of the filter element abutting said opening, in order to achieve minimum pressure drop across the cleaner. Likewise, the second opening should also be of at least the same diameter.

Referring now to FIG. 3, an air cleaner comprises a cylindrical casing having a radial opening 20 in the cylindrical wall 21 and an axial opening 22 in one end wall 23. The opposite end is closed by a removable cover 24 which serves to give access to a filter element installed inside the casing. Details of attaching the cover to the casing are not material to the invention and need no be discussed in any detail. The filter element has two pleated paper frustoconical portions 25 and 26, respectively, each supported by inner and outer tubes of perforated metal (not shown), exactly as previously described in relation to FIGS. 1 and 2. The portions are assembled in partly telescoped relation with their overlapped ends joined by an impermeable member 27 to prevent leakage through the annular space between the portions. The ends of the portions together with their supporting tubes are sealed into end caps 28, 29, 30 and 31, respectively. The cap 28 has an annular sealing gasket 32 around the axial opening 22. The cap 31 incorporates a central blanking plate 33 to close the end of the element. The portions are both in the form of a frustrum of a cone and they have a common axis which is tilted relative to the axis of the casing. This is achieved by virtue of the configuration of the casing end walls, which are arranged to lie in parallel planes at an angle to the normal to the axis of the casing. This enables the filter element to be symmetrical, which is the simplest form to manufacture. The FIG. 3 embodiment provides not only a large amount of filter paper for a given casing axial dimension, but also the pleat spacing in the individual element portions can be optimised, so as to make best use of the extra paper area available.

Whilst the foregoing embodiments feature a radial inlet to the casing, the inventon is also effective with a tangential inlet. In fact, it has significant advantages in the context of a tangential inlet, because it is useful in minimising a problem caused by the latter. This is that the swirl (around the element) caused by a tangential inlet is not converted into static pressure on the outer surface of the element. Instead, it is gradually dissipated around the element, resulting in an increase in the pressure drop (restriction) of the order of up to 20%, typically 2½ cm water gauge. Tilting the element axis counteracts this loss, by restricting flow around the element and causing a stalling effect on the air movement.

The use of a tangential inlet is frequently desirable for cosmetic reasons; it often enables a neater pipework assembly to be used, for example along the back wall of a vehicle cab. By adopting the principles of the present invention a tangential inlet can be used in circumstances where it would otherwise give rise to unacceptable cleaner performance.

I claim:

1. An air cleaner of the kind employing a pleated paper filter element in the form of a frustum of a cone mounted in a tubular casing having a first opening axially thereof communicating with the inside of said element at the relatively wide end of said frustum and a second opening in the cylindrical wall of said casing communicating with the outside of said element in the vicinity of the relatively narrow end thereof, the axis of said element being positioned so that it is tilted relative to the axis of the casing away from said second opening in the direction from said first opening to said second opening, whereby the radial clearance between the filter element and said second opening is increased for a given filter element without increasing the size of the casing.

2. The air cleaner of claim 1, wherein the second opening is, in use, the inlet and the axial opening is the outlet.

3. The air cleaner of claim 1 or claim 2 wherein the relative tilt of the filter element axis is provided by making the opposite ends of said element lie in parallel planes which are not normal to the axis of the element.

4. The air cleaner of claim 1 or claim 2 wherein the relative tilt of the filter element axis is provided by the configuration of the end wall portions of the casing, said portions being arranged to lie in parallel planes which are not normal to the axis of the casing, but which are normal to the axis of the filter element when installed in said casing.

5. The air cleaner of claim 1 wherein the element is in the form of two frustoconical portions assembled in partly telescoped relation with their overlapped ends joined by an impermeable member, whereby leakage through the annular space between the portions is prevented.

6. The air cleaner of claim 1 wherein the first opening in the casing has a diameter substantially equal to the inside diameter of the element abutting thereto.

7. The air cleaner of claim 1 wherein the second opening is directed tangentially of the casing.

* * * * *